UNITED STATES PATENT OFFICE.

JACOB ELIAS ALBERT BÖKELUND, OF MAJORNA, SWEDEN.

VARNISH FOR USE IN OIL-PAINTING.

SPECIFICATION forming part of Letters Patent No. 466,393, dated January 5, 1892.

Application filed March 18, 1891. Serial No. 385,447. (No specimens.)

*To all whom it may concern:*

Be it known that I, JACOB ELIAS ALBERT BÖKELUND, a subject of the King of Sweden, residing at Majorna, Göteborg, Kingdom of Sweden, have invented a new and useful Improvement in Varnishes Adapted for Use in Place of Linseed-Oil Varnish in Oil-Painting, of which the following is a specification.

My invention has reference to a composition or preparation intended to be used as a substitute for linseed-oil in the preparation of oil-paint, the principal ingredient of which is rosin-oil.

My preparation or composition consists of rosin-oil, mineral oil, and alcohol (which may be purified alcohol to which methyl has been added) in suitable proportions. I take, for example, thirty (30) to thirty-four (34) parts, in volume, of rosin-oil; eight (8) to twelve (12) parts, in volume, of refined mineral oil, (by which is meant purified American or Russian petroleum, such as used for illuminating purposes,) and two (2) to four (4) parts, in volume, of alcohol, which may be such as above referred to. These several ingredients are thoroughly mixed together under a temperature of from twenty degrees (20°) to thirty degrees (30°) centigrade, when the same is ready for use.

Having thus described my invention, what I claim as new, and desire to secure by Letters Patent of the United States, is—

As a new article of manufacture, a preparation or composition intended as a substitute for linseed-oil varnish in oil-painting, the same consisting of rosin-oil, refined mineral oil, such as specified, and alcohol or spirits to which methyl has been added in the proportions substantially as set forth.

In witness whereof I have hereunto signed my name in the presence of two subscribing witnesses.

JACOB ELIAS ALBERT BÖKELUND.

Witnesses:
NISE A. ELFWING,
ERNST SVANQVIST.